(12) United States Patent
Yuksel (10) Patent No.: US 9,177,421 B2
(45) Date of Patent: Nov. 3, 2015

(54) HAIR MESHES

(76) Inventor: Cem Yuksel, College Station, TX (US)

( * ) Notice: Subject to any disclaimer, the term of this patent is extended or adjusted under 35 U.S.C. 154(b) by 830 days.

(21) Appl. No.: 12/882,153

(22) Filed: Sep. 14, 2010

(65) Prior Publication Data

US 2011/0063291 A1    Mar. 17, 2011

Related U.S. Application Data

(60) Provisional application No. 61/242,533, filed on Sep. 15, 2009.

(51) Int. Cl.
*G06T 13/40*    (2011.01)
*G06T 17/20*    (2006.01)

(52) U.S. Cl.
CPC ................. *G06T 17/20* (2013.01); *G06T 13/40* (2013.01)

(58) Field of Classification Search
None
See application file for complete search history.

(56) References Cited

U.S. PATENT DOCUMENTS

| | | | |
|---|---|---|---|
| 5,764,233 A | 6/1998 | Brinsmead et al. | |
| 6,720,962 B1 | 4/2004 | Alter | |
| 6,940,508 B2 | 9/2005 | Lengyel | |
| 7,348,973 B1 | 3/2008 | Gibbs et al. | |
| 2005/0212800 A1 | 9/2005 | Petrovic et al. | |
| 2005/0248572 A1* | 11/2005 | Lengyel | 345/428 |
| 2008/0036782 A1* | 2/2008 | Bruderlin et al. | 345/581 |
| 2008/0043021 A1* | 2/2008 | Huang et al. | 345/428 |

FOREIGN PATENT DOCUMENTS

JP    2009020874 A    1/2009

OTHER PUBLICATIONS

Magnenat-Thalmann, Nadia, et al. "Interactive virtual hair-dressing room." Computer-Aided Design & Applications. CAD Solutions 3 (2006): 535-546.*
Plante, Eric, Marie-Paule Cani, and Pierre Poulin. "A layered wisp model for simulating interactions inside long hair." Computer Animation and Simulation 2001. Springer Vienna, 2001.*
Yang, Xue Dong, et al. "The cluster hair model." Graphical Models 62.2 (2000): 85-103.*
Yang, Gang, et al. "Interactive fur modeling based on hierarchical texture layers." Proceedings of the 2006 ACM international conference on Virtual reality continuum and its applications. ACM, 2006.*
International Search Report and Written Opinion Mailed May 13, 2011 in PCT/US2010/048806.
Chuan Koon Koh and Zhiyong Huang, "A Simple Physics Model to Animate Human Hair Modeled in 2D Strips in Real Time," Proc. of the Eurographic workshop on Computer animation and simulation, Manchester, UK, 2001, pp. 127-138, Springer-Verlag New York, Inc., New York, NY.

(Continued)

*Primary Examiner* — Daniel Hajnik (57) ABSTRACT

Aspects include provision of a hair mesh structure that can be used for modeling, animating, simulating, and/or rendering hair and hair-like objects in the field of computer graphics. The hair mesh structure can use an ordered plurality of surface primitives, which can be represented by correspondence data, and mapping(s) of points on corresponding surface primitives. A plurality of paths can be generated based on the mappings. These paths can be used to generate hair-like geometry elements. Therefore, hair can be modeled, edited, and animated by editing surface primitives. This approach provides control of the hair shape and permits hair modeling using surface modeling processes, without direct editing of curves defining hairs themselves.

28 Claims, 6 Drawing Sheets

(56) References Cited

OTHER PUBLICATIONS

Wenqi Liang and Zhiyong Huang, "An Enhanced Framework for Real-Time Hair Animation," Proc. of the 11th Pacific Conference on Computer Graphics and Applications, Oct. 8-10, 2003, Canmore, Canada, pp. 467-471.

Paul Noble and Wen Tang, "Modelling and Animating Cartoon Hair with Nurbs Surfaces," Proceedings of the Computer Graphics International, 2004, pp. 60-67, IEEE Computer Society, Washington, DC.

Tae-Yong Kim and Ulrich Neumann, A Thin Shell Volume for Modeling Human Hair, Proceedings of the Computer Animation, 2000, Philadelphia, PA, p. 104, IEEE Computer Society, Washington, DC.

Lieu-Hen Chen, Santi Saeyor, Hiroshi Dohi and Mitsuru Ishizuka, "A System of 3D Hair Style Synthesis Based on the Wisp Model," The Visual Computer, 1999, vol. 15, No. 4, pp. 159-170.

Xue Dong Yang, Zhang Xu, Tao Wang and Jun Yang, The Cluster Hair Model, Graphics Models, Mar. 2000, vol. 62, issue 2, pp. 85-103, Academic Press Professional, Inc., San Diego, CA.

Zhan Xu and Xue Dong Yang, "V-HairStudio: An Interactive Tool for Hair Design," IEEE Computer Graphics and Applications, May 2001, vol. 21, issue 3, pp. 36-43, IEEE Computer Society Press, Los Alamitos, CA.

Byoungwon Choe and Hyeong-Seok Ko, "A Statistical Wisp Model and Pseudophysical Approaches for Interactive Hairstyle Generation," IEEE Transactions on Visualization and Computer Graphics, Mar. 2005, vol. 11, issue 2, pp. 160-170, IEEE Educational Activities Department, Piscataway, NJ.

Tae-Yong Kim and Ulrich Neumann, "Interactive Multiresolution Hair Modeling and Editing," Proc. of the 29th annual conference on Computer graphics and interactive techniques, 2002, pp. 620-629, ACM, New York, NY.

Ken-Ichi Anjyo, Yoshiaki Usami and Tsuneya Kurihara, "A Simple Method for Extracting the Natural Beauty of Hair," Proc. of the 19th annual conference on Computer graphics and interactive techniques, 1992, pp. 111-120, ACM, New York, NY.

Yizhou Yu, "Modeling Realistic Virtual Hairstyles," Proc. of the 9th Pacific Conference on Computer Graphics and Applications, 2001, p. 295, IEEE Computer Society, Washington, DC.

Sunil Hadap and Nadia Magnenat-Thalmann, "Interactive Hair Styler Based on Fluid Flow," Eurographics Workshop on Computer Animation and Simulation, 2000, pp. 87-100.

Kelly Ward, Nico Galoppo and Ming Lin, "Interactive Virtual Hair Salon," Presence: Teleoperators and Virtual Environments, Jun. 2007, vol. 16, issue 3, pp. 237-251, MIT Press, Cambridge, MA.

\* cited by examiner

HAIR MESHES

CROSS-REFERENCE TO RELATED APPLICATIONS

This application claims priority from U.S. Prov. Pat. App. No. 61/242,533, filed on Sep. 15, 2009, entitled "Hair Meshes", and which is hereby incorporated by reference in its entirety for all purposes.

BACKGROUND

1. Field

The following relates generally to computer graphics and, more specifically, to modeling and animating hair and other hair-like geometry.

2. Related Art

Hair is an important visual component of virtual characters. For example, the shape of a virtual character's hair significantly affects the visual appearance of a character. Hair-like materials are prevalent in many computer graphics situations. Therefore, artists can be helped by being able to use tools for creating, visualizing and manipulating hair models for virtual characters, as well as other surfaces with hair-like characteristics, such as grasses, fur, and so on.

However, realistic hairstyles form complicated geometric structures that make them very difficult to model. A real human head generally contains more than a hundred thousand hair strands, each of which can be a complicated space curve (i.e., a curve in 3-D space). Therefore, modeling each and every hair strand individually is not feasible in practice.

Various approaches have been proposed to simplify hair modeling, at least some of which are introduced below, by way of introduction and background. However, such introduction is not an exhaustive treatment of these techniques, nor impliedly a comprehensive list of approaches that may have been proposed.

One way of hair modeling is through representing the hair model with only an outer surface using parametric surfaces of NURBS patches. This surface can be given a hair like appearance by a texture map of a hair image with a transparency channel. Alternatively, actual hair geometry can be generated along this flat surface. These methods can be improved by adding a thickness to the surface and generating hair strands within a thin shell around this surface. Since the hair model is represented by a flat surface, such methods can only generate hair strands near the outer surface of a hair model and the rest of the hair strands inside the hair volume are not produced with these approaches. Therefore, these methods are limited in terms of the hairstyles that they can properly represent and they generally considered unsuitable for producing realistic hair models.

Another hair modeling approach is to specify various characteristics of a hair model using texture maps on the surface on which the user aims to grow hairs. Multiple texture maps can be used to specify multiple characteristics of hairs growing out of a certain area. Such approaches are most useful for modeling fur and short hair. However, it is difficult to use texture maps for creating complex hairstyles, since the hair model can only be controlled indirectly by varying the colors of various texture maps, and they are considered unsuitable for modeling long hairstyles.

A common hair modeling technique is using wisps (or generalized cylinders). A wisp is essentially a curve in 3D with some thickness. Individual hair strands are generated along this wisp curve within a neighborhood defined by its thickness. The shapes of individual hair strands are often altered by procedural modeling techniques, such as a random variation or a noise function. A hair model can be created using multiple wisps placed within the hair volume. Wisps are most useful for modeling hairstyles with well-defined clusters each of which can be represented by a wisp. However, the resulting hair model appears like multiple clusters of hairs, which are often unrealistic for most hairstyles. Furthermore, modeling and editing a large collection of wisp curves that represent a complex and realistic hairstyle can be difficult and labor intensive. Even small changes to the overall shape of a hair model may require a large collection of wisps within the hair volume to be modified accordingly.

Another common hair modeling approach is interpolating a number of manually created guide hairs. Guide hairs represent a small subset of all hair strands of a hairstyle. The user explicitly models guide hairs and the rest of the hairs are generated by automatically interpolating the shapes of nearby guide hairs. An interpolation can eliminate or reduce undesired clustering produced by wisp-based techniques. After the interpolation, the shapes of individual hair strands are often modified using procedural techniques, which help to produce more natural hairstyles and controlled clustering. However, the modeling process of guide hairs is very similar to modeling wisps. Therefore, depending on the complexity of the hairstyle and the number of guide hairs required, defining the shapes of the guide hairs can be difficult and very laborious.

Another modeling approach for hair makes use of shell surfaces. In this approach hair strands are rooted on one shell surface and they all grow towards a second shell surface, which has a topology that is matched to the first shell surface. Multiple shell surfaces with matching topologies may be used for generating longer hairstyles or for providing more control over the shape of the hair model. Such approaches are quite restrictive in terms of the hair models they can represent and they are not suitable for modeling complex hairstyles. Furthermore, the fact that the user needs to model all shell surfaces explicitly makes these methods less favorable in practice.

To simplify hair modeling process, researches and developers have also tried using different physically based simulation techniques. Such methods include simulating the effect of gravity to find the rest poses of hair strands, simulating a real-world hair dressing session using haptic controls and physically based simulation, modeling hair as streamlines from a fluid dynamics simulation, and using 3D vector fields to shape hair strands or wisp curves. These methods can simplify the modeling process of the overall hair shape and various hairstyles can be generated using these methods. However, just like any other simulation method, controlling these techniques in a precise manner is not easy. With these techniques the shape of the overall hair model is defined indirectly by various parameters of the system and this indirect control makes it difficult to achieve the exact hair model desired by the user.

While at least some of the techniques described above may be able to generate a variety of hairstyles, they lack explicit control over the shape of the overall hair model, they are labor intensive and time consuming, and/or are not intuitive for artistic use. Therefore, there is a need for continued improvements in hair modeling methods and systems.

DETAILED DESCRIPTION

It is to be understood that these disclosures are merely illustrative examples of aspects and embodiments to teach those of ordinary skill how to make and use implementations according to the claims. Reference herein to details of examples is not intended to limit the scope of the claims, nor is the absence of description, in any given context, concerning a detail an implication that its usage is precluded in such context.

The background described a variety of conventional approaches to modeling hair in computer graphics. The following description relates to a technique, that for ease of description, is called "hair meshes". The nature of modeling hair using "hair meshes" may be better understood through a brief introductory example. Modeling hair through usage of hair meshes can be conducted by constructing a hair mesh. A hair mesh can be constructed from a collection surface primitives, which can be used to define a topology of the hair mesh. For example, the surface primitives can define a start surface (e.g., a root surface) at which hair strands are to begin, one or more intermediate surfaces, and one or more end surfaces. The sequence of surfaces from root surface(s), through intermediate surface(s) to end surface(s) can be used to define a volume in which hair strands can exist. Locations of hair strands in the volume can be defined by sets of points on the surfaces, where each set of points can define a path of a hair strand. The path of the hair strands can be adjusted by manipulating the topology of the volume, such as by extruding or bending (as described in further detail below). Many further details are described below, and still others may occur to those of ordinary skill from understanding these disclosures.

Examples of areas where a variety of implementations exist include how (and/or by what) the surface primitives are defined, what topology is expressed from a given set of surface primitives, how the hair strands can be defined within the volume defined by the topology, and what topological operations can be done to revise the topology. Other examples are where hair strands begin and end, how many start and end surfaces there are in a given hair mesh, how hair strands are located or relocated within the hair mesh, responsive to changes in a outer surface of the hair mesh, and so on.

For ease of explanation, the following example relates to defining or modeling hair strands rooted on an existing object model, referred as a root object, such as a human head. However, implementations do not require a root object as input, nor do generated hair strands need be rooted on an object. Further, these exemplary aspects may be used to model any hair like structure such as fur or furry skin, grass or similarly shaped plants, fibers of a carpet, strands of clothing, or any other hair-like structure. Therefore, the term hair is used for referring to any hair-like structure.

Defining an Overall Structure of a Hair Mesh

Figures 1, 2, 3, 4:
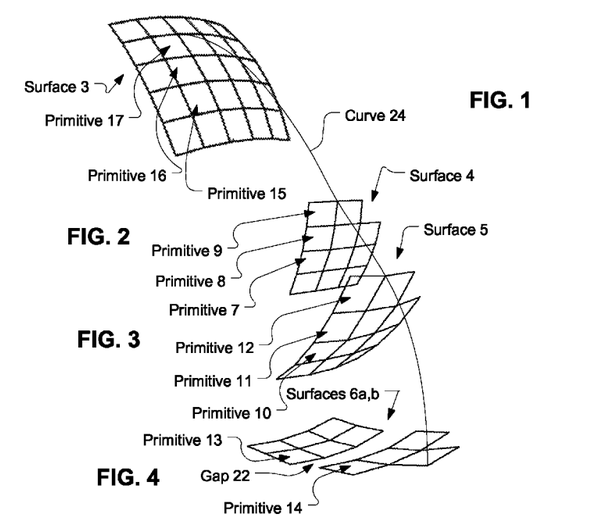
FIG. 1 depicts starting surface (can also be called a root surface) for a hair mesh, according to an example aspect described herein.
FIG. 2 depicts a first intermediate surface for the hair mesh.
FIG. 3 depicts a second intermediate surface for the hair mesh.
FIG. 4 depicts an ending surface (also can be called a tip surface) for the hair mesh.

FIG. 1 depicts a surface 3, composed of a plurality of primitives, three of which are identified as primitives 15-17. In this example, surface 3 functions as a root surface in a hair mesh 1 (as explained with respect to FIG. 5, below). FIG. 2 depicts a first intermediate surface 4, also composed of a plurality of primitives, three of which are identified as primitives 7-9. FIG. 3 depicts a surface 5, composed of a plurality of primitives, of which primitives 10-12 are identified.

Finally, a surface 6 (composed of two disjoint components, surfaces 6a and 6b), having primitives 13 and 14, respectively. Surface 6 functions as a tip surface in the example hair mesh, where hair strands can terminate. It also will be described that some of the hair strands that ultimately will be constructed based on the hair mesh terminate at surface(s) other than surface 6, such that these other surfaces can function as tip surfaces for those hair strands. As such, a hair mesh can have any number of tip surfaces.

The surfaces 3-6 can function to define an elongate direction of the hair strands that will be defined based on the hair mesh. Outer edges of the hair strands can be connected together, to define an outer surface of the hair mesh volume, as described in more detail below.

Figures 5, 6:
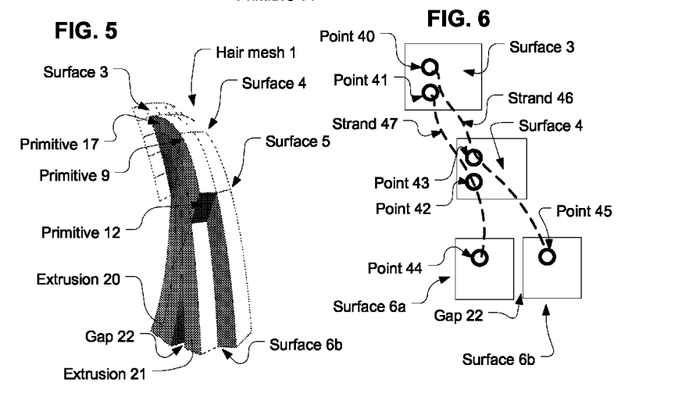
FIG. 5 depicts an extrusion based on the surfaces of FIGS. 1-4, the extrusion representing the outer surface of the hair mesh.
FIG. 6 depicts locating points on primitives composing the surfaces of FIGS. 1-4, which can be used to guide the creation of hair strands.

FIG. 5 depicts the example hair mesh 1 introduced above, which can be conceived as an extrusion following a path defined by surfaces 3-6. A relationship between correspondences of particular primitives of each surface, and the hair mesh 1 are described below.

Surfaces transverse to surfaces 3-6, bounded by based on the outer edges of surfaces 3-6 provide a mechanism for realizing a shell (e.g., an outer surface) for hair mesh 1. By particular example, edges of corresponding primitives on neighboring surfaces (e.g., surfaces 3 and 4) can be connected with curved patches. Such patches provide side faces of prisms that connect corresponding primitives on consecutive layers (as explained in further detail with respect to FIG. 9, below). This visualization can be useful for displaying the shape of the hair model without having to generate and properly render individual hair strands. Therefore, the visualization of hair mesh 1 of FIG. 5 can be used as a fast preview of the hair model, as a basis for manipulating the overall shape of the hair model.

In one example, a hair mesh is a 3D mesh describing a volume of space enclosing the hair. Layers of polygonal meshes are defined within the volume. A first layer of the hair mesh coincides with the surface of the root object, and can be referred to as a "root layer". To create a path for each hair, a number of additional layers are placed on top of the root layer, such that each selected face on the root layer has a corresponding face on the next layer. Connecting the two corresponding faces on two consecutive layers forms a prism such that these faces are the two base faces of the prism. A collection of such prisms that connect all corresponding faces of a root face can be referred to as a bundle. In such terminology, a bundle thus can define a volume in 3-D space for a particular hair strand or group of hair strands. The hair mesh faces on the last layers of bundles can be called tip faces.

Given this correspondence between layers, a path for each hair strand can be created starting from the root layer. For a given point on a root layer face, a mapping function that determines the corresponding points on all corresponding hair mesh faces can be used. A simple mapping function is the barycentric coordinate of the given root point on the root layer face. Using the same barycentric coordinate on all corresponding faces, an ordered collection of points is generated such that each points lies on a surface primitive. This collection of points defines the path of the hair strand that is rooted at the given point. Any curve formulation can be used the define shape of the hair strand from these points.

In further detail, FIG. 5 depicts that primitive 17 of surface 3 is a root surface for hair mesh 1, which includes an extrusion through primitive 9 of surface 4, terminating at primitive 12 of surface 5. FIG. 5 further depicts that primitive 16 of surface 3 is a root for an extrusion 21 that extrudes through primitive 8 of surface 4, and primitive 11 of surface 5 to terminate at primitive 14 of surface 6b. Extrusion 20 has a root at primitive 15 of surface 3, extends through primitive 7 of surface 4, through primitive 10 of surface 5, and terminates at primitive 13 of surface 6a. A gap 22, identified both with respect to FIG. 4 and with respect to FIG. 5 is created by the separation of primitives 13 and 14. A curve 24 identifies how edges of surfaces 3-6 can be used to define an outer boundary of hair mesh 1 (curve 24 identifies a curve along a top surface of hair mesh 1 depicted in FIG. 5).

As will be described in further detail with respect to FIG. 6, correspondences between the surfaces (and/or primitives of the surfaces) can be established, which control an ordering of how the surfaces will be used to define hair mesh 1. In FIG. 1, the correspondences indicate an ordering shown by the depicted flow of the surfaces from FIGS. 1-4. Data representing such correspondence can include a list, indicating the desired order of the surfaces. Other implementations can be provided, for example, an array can be provided for each path through the list or tree, such that a number of arrays can each define a possible path for hair strands through hair mesh 1.

As would be understood by those of ordinary skill in the art, a variety of implementations may be provided for representing such information, and any given form for representing such data can be selected based on particular requirements of the system being used for practicing the disclosed aspects.

In one particular example, the correspondences can be represented by a list of correspondences between pairs of surface primitives (such as on consecutive surfaces, e.g., surfaces 3 and 4). Hair strands that go through a surface primitive grow towards a next surface primitive defined (selected) using such correspondence. For example, in FIG. 1, hair strands that are rooted on the surface primitive 17 grow towards the surface primitive 9, which can be indicated by a correspondence primitive 17→primitive 9. Likewise, such hairs can continue growing towards the surface primitive 12, indicated by a correspondence primitive 9→primitive 12.

Different surface primitives can have a different correspondence than other surface primitives of the same surface. For example, not all primitives of a given surface may have a corresponding next surface, even though some do. In such circumstances, information about correspondences of particular primitives can be maintained. For example a primitive-by-primitive correspondence list can be maintained. As an example, Table 1 below, depicts correspondences for three series of primitives, which were discussed above in the context of hair mesh 1 in FIG. 5. In particular, Table 1 shows that the correspondence for primitive 17 ends with three primitives, while the correspondences for primitives 16 and 15 have a total of four primitives; this situation maps to the termination of one extruded portion of hair mesh 1 prior to the other depicted parts.

TABLE 1

| Primitive ID | Primitive ID | Primitive ID | Primitive ID |
| --- | --- | --- | --- |
| Primitive 17 | Primitive 9 | Primitive 12 | — |
| Primitive 16 | Primitive 8 | Primitive 11 | Primitive 14 |
| Primitive 15 | Primitive 7 | Primitive 10 | Primitive 13 |

Any number of ways can be provided to represent data indicating such primitive correspondences. For example, a series of vertexes can be used to represent such correspondences, where the vertexes each are used to form one or more of the primitives in question.

Also, although the example of FIGS. 1-5 did not depict such, primitives of a single surface can correspond with one another. For example, primitive 17 could be defined to correspond with another primitive of surface 3, such that surface 3 can be both the root and tip surfaces for hair strands following that correspondence, or further primitives can follow, or be between such primitives. A plurality of such primitives on one surface can be part of such correspondence. These further examples are by way of illustrating that the disclosure is not limiting as to what kinds of topologies can be created.

In summary of FIGS. 1-5, these figures depict components of a hair mesh 1 structure, which can be used to generate hair strands. A root layer, shown in FIG. 1, is surface 3. More generally, such surface can be composed of one or more surface primitives. FIGS. 2-4 depict subsequent layers, each also composed of one or more surface primitives.

In one approach, when hair strands are generated, their roots reside on the root layer, they "grow" towards the next layer (surface 4 in FIG. 2), and continue through the surface primitives of each layer until reaching the tip layer. As explained above, a tip layer for one hair may not be the tip layer for another hair, but rather hairs can terminate at different surfaces (e.g., primitive 12 of surface 5 and primitives 13 and 14 of surface 6, as addressed above). In sum, each hair can be rooted on a respective root surface, and end at a respective tip surface. The root and tip surfaces can be different for different hairs. There generally would be one or more other surfaces intermediate the root surface and the tip surface for a particular hair strand. There can be different surfaces and/or different numbers of surfaces for each hair. Some hairs may end before others, for example.

Generation of Hair Strands

FIG. 6 is used to a basis for describing examples of how individual hairs (hair strands) can be generated. Such hair strands, as explained below, can be guide strands, which can be used to later create more hairs based on each guide strand.

Generation of individual hair strands can proceed as follows. A point on a surface primitive of a root object surface (e.g., primitives 15-17 of surface 3) can be selected. The selection process can proceed in any number ways, and in some implementations, such selection can be random, pseudorandom, or based on any rule or mathematical expression. Although in some cases, this example describes "a point" or "a surface", the usage does not imply singularity.

This point serves as a first control point of a curve that defines a path for a hair strand (can be referred to as a "hair strand curve" or "hair strand"). Using the correspondence list, a next surface (or surface primitive, or point) (e.g., surface 4, or a primitive from primitives 7-9) is identified, and a next control point on that next surface is determined for the curve.

A mapping function can be used to determine the location of this next control point on the surface (or surface primitive) of this next surface. Such mapping function can be used to determine, for each point defined on a surface primitive of the root layer (here, surface 3), a respective location of a next point on surface 4 for each hair strand.

An example mapping function that is used in the exemplary embodiment is based on barycentric coordinates for points on surface primitive(s) at a first surface (e.g., surface 3) and using those barycentric coordinates on corresponding surface primitive(s) on subsequent surfaces to locate the respective positions of the next points for each hair strand curve. As such, an example mapping can include information defining an ordered list of primitives, and barycentric coordinates that can be used to identify a point on each primitive of the list, as exemplified in FIG. 7.

FIG. 6 depicts a more particular example, for two hair strands 46 and 47. In FIG. 6, points 40 and 41 are on surface 3, which is the root surface in this example. Surfaces 4, 5, and 6 have been defined as subsequent surfaces, and more particularly, correspondences among pluralities of the primitives of these surfaces have been defined, as disclosed above. For example, in FIG. 6, a correspondence for strand 46 can include primitives 16, 8, 11, and 14 (note FIG. 6 does not separately depict surface 5 for either strand 46 or 47), and a correspondence for strand 47 can include primitives 15, 7, 10, and 13. A point on each primitive for each correspondence can be identified. In particular, for strand 46, points 40, 43, and 45 are points on surfaces 3, 4, and 6, respectively; for strand 47, points 41, 42, and 44 can be provided. Gap 22, introduced in FIG. 5, is shown also in FIG. 6.

Figure 7:
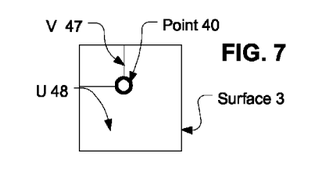
FIG. 7 depicts an approach where the points of FIG. 6 can be located based on (U,V) barycentric coordinates.

FIG. 7 depicts that a respective location within each primitive can be tracked with barycentric coordinates, exemplified for point 40 on surface 3 for strand 46, as (U,V) 47, 48.

Generalized barycentric coordinates can be computed for an entirety of a potentially irregular polygon (which can include an arbitrary number of primitives, in an example), or barycentric coordinates can be defined for a particular constituent polygon of a given surface (e.g., the surface of Layer 1). Mean value coordinates can be used for computing generalized barycentric coordinates.

Stated differently, an arbitrary point is picked on an arbitrary surface primitive as a first control point of a hair strand. The correspondence and the mapping function can be used to identify/determine other control points of the hair strand that reside on each layer of the hair mesh. These control points can define the path of the hair strand. As would be understood, the first surface primitive can be a pre-determined root surface, for a number of strands, or it can simply be a primitive of the hair mesh.

Any curve formulation can be used for building a path of the hair strand using these control points. An exemplary approach uses Catmull-Rom curves, which are curves that are selected to traverse a given set of control points, with interpolation between the control points. However, usage of such curves is not a requirement and any other curve formulation approach can be used, whether or not the curve formulation approach allows for interpolation.

The hair strand can use the entire curve or a portion of it. Furthermore, the curve or its control points can be modified for producing the final hair strand. In the exemplary embodiment the control points of the curve can be modified using various procedural functions to add statistical variations to individual hair strands that enhances the realism of the final hair model ("hair styling").

For the sake of simplicity, the exemplary embodiment herein described assumes that the root object surface is represented by a polygonal mesh. However, aspects herein can be practiced with other surface representations. Since the surface primitive of a polygonal mesh is a polygon, the other surfaces that define the volume of the hair mesh also can be constructed from the same surface primitive. The polygons of the root object and the hair mesh can be referred to as primitives or "faces" (a primitive or face can be a component of a surface or layer).

Such topology can be determined according to a procedure, examples of which are disclosed below. Such examples of what topology can be determined from a given set of surface primitives are not intended to be exhaustive, but rather illustrative, and hence, difference procedures can be employed to use a given set of surface primitives for defining such topology.

Also, defining surfaces can be performed by a user who is modeling hair using the hair mesh structure (e.g., using a user interface of a computer for providing input to perform such building). However, such defining also can also be performed algorithmically based on an accessed set of parameters or other characteristics that control the surface or surfaces generated. Further, such defining can include accessing existing data descriptive of such surface(s), and using those surfaces as described. A combination of such approaches can be employed in a particular implementation. For example, the component data used to define the hair mesh that is built by the user can be saved to a computer readable medium as components, rather than as a finished set of hair strands defined as curves 3-D space. Such component data can be accessed, and the set of hair strands defined or constructed as required.

As such, a path for each hair strand can be created starting from the root layer. For a given point on a root layer face, a mapping function that determines the corresponding points on all corresponding hair mesh faces can be used. A simple mapping function is the barycentric coordinate of the given root point on the root layer face. Using the same barycentric coordinate on all corresponding faces, an ordered collection of points is generated such that each points lies on a surface primitive. This collection of points defines the path of the hair strand that is rooted at the given point. Any curve formulation can be used the define shape of the hair strand from these points.

Figures 8, 9:
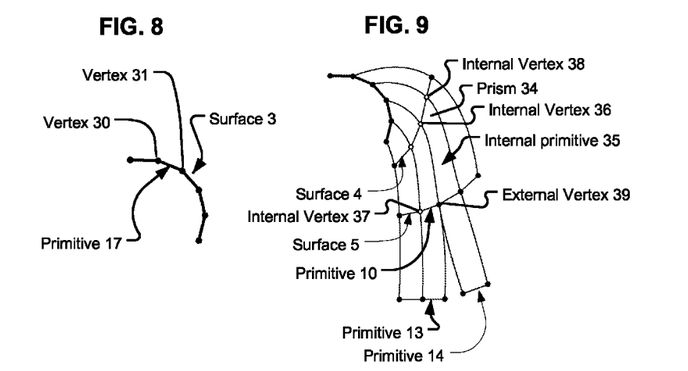
FIG. 8 depicts a side view (cross-section) of the root surface of FIG. 1
FIG. 9 depicts a cross-section of the extrusion of FIG. 5, identifying internal vertices, surfaces and primitives introduced with respect to previous figures.

FIG. 8 depicts a side view of surface 3, to allow better depiction of vertices 30 and 31 (and other vertices not separately identified). As shown, primitive 17 is determined at least in part by vertices 30 and 31 (and one or more other vertices not depicted).

FIG. 9 shows hair mesh 1 further developed with surfaces 4, 5, and 6*ab*, with internal vertices. In particular, surface 4 includes internal vertexes 38 and 36, while internal vertex 37 of surface 5 is identified. These internal vertices can be made available for direct editing by a user. However, by algorithmically modifying the internal vertices, responsive to changes to the external vertices, editing of hair mesh 1 can be simplified, from the perspective of a user.

FIG. 9 depicts that prisms can be formed from vertexes of corresponding adjacent surfaces, and in particular, prism 34, defined by internal vertices 35-37 and an external vertex 39 is identified, although a number of other such prisms are depicted in FIG. 9, but not explicitly identified. Prism 34 is between surface 4 and surface 5, and would include corresponding surfaces defined in part by other edges of primitives from surface 4 and 5 (the ends of prism 34). Editing of vertexes, and faces can affect a number of internal and a number of external vertices in the hair mesh, along with their locations.

The prisms depicted in FIG. 9 allow sub-volumes within hair mesh 1 to be manipulated, and which in turn affects the mappings comprising control points that guide positioning of hairs, such as guide hairs or bundles of hairs. End surfaces of such prisms can be controlled by what shape is selected for the shape of primitives forming the surfaces 3-6, and can be, for example, parallelograms, triangles, pentagons, hexagons, octagons, and so on, as well as mixtures thereof.

The vertices of the hair mesh are described as either external vertices, which lie on the outer surface of the mesh, or internal vertices. This classification is illustrated in FIG. 9, where external vertices are shown as filled circles, and internal vertices are shown as empty circles. Several topological operations can generate new vertices (both external and internal), or convert vertices between external and internal vertices.

A user could explicitly position all these vertices. However, a large number of internal vertices can be generated during construction of the hair mesh. In fact, since the number of external vertices is proportional to surface area, while interior vertices are proportional to volume (square ratio versus cubic ratio), a number of internal vertices may dominate the total number of vertices in complex hair models. Further, these internal vertices are problematic for the user because they lie inside the enclosed volume of the hair mesh, making them harder to see, especially when the hair mesh is visualized as a surface. Therefore, users are given an option to hide internal vertices, allowing the system to place, move and replace these vertices automatically responsive to changes to the positions of external vertices.

While many techniques may be used to automatically place internal vertices, in an exemplary embodiment, a constrained quadratic minimization is employed. An error metric can be defined in terms of the positions of all hair mesh vertices, where the external vertices are fixed. Positions of internal vertices that minimize this metric are solved using a minimization process. An example error metric is a difference between pairs of vectors connecting two vertices of each surface (primitive on a surface) to the two vertices of the corresponding surface (e.g., a corresponding primitive on an adjacent surface, as determinable from correspondence data). This error metric allows minimization of the difference in the local hair direction between adjacent edges along an extrusion direction. A strict minimization is not required in implementations according to this example, or more generally when employing automatic vertex placement approaches in accordance with these disclosures.

With this automatic internal vertex placement operation, users can concentrate on the outer surface of the hair mesh model and ignore the shape of the hair mesh structure inside the volume enclosed by the outer surface, bringing hair mesh modeling closer to standard surface modeling.

Although these disclosures use an example where a hair mesh has layers that correspond with one another, and often control points for hair strands in such a hair mesh would have the hair strands piercing the layers, these disclosures are not by way of limitation. For example, control points can run parallel to a primitive, or to a surface of primitives. Also, primitive/surface normals can be considered, such that a sequence of control points can be provided on surface, where some of the points are considered to be on a "side" of the primitive (or surface's) normal direction, while others can be considered on the other side.

Also, in order to aid in understanding of these disclosed aspects, it was explained that control points for hair strands can be located on surfaces, which can have a defined relative order. However, implementations according to these disclosures can be practiced without explicit definition of such surfaces. In one view, each surface can be used to define a relationship among subsets of control points for a number of curves. Such relationships also can be more explicitly defined, in that such control points can be given explicit positions with respect to a reference point or points, or with relative to each other, and such positions can be modified responsive to changes, such as to changes in shapes of control surfaces, which can be peripheral surfaces of a hair mesh, in an example. For clarity, such control points (e.g., control points on a common surface) can be referred to as peer points or peer control points, to evidence that they can be subject to a mutual constraint system, automatic repositioning, and the like.

Topological Operations for Manipulating Hair Meshes

The user can be provided a number of topological operations, which allow editing of the hair mesh, while preserving topological constraints. For ease of explanation, the term "layer" is used to refer to a surface, where an ordering of the surfaces may need to be implied.

At a start of modeling, before a hair mesh has any layers, or perhaps only a single layer, the root layer and the tip layer(s) coincide. A user interacting with the mesh will typically model the hair by "growing" one or more layers from the root layer, specifying geometric and topological changes in each layer. To perform this modeling, the following example operations can be used for creating and modifying the hair mesh. In these examples, a surface primitive also can be called a "face".

Layer/Face Extrude: Face extrusion can provide a primary operation to create new layers. In one example, face extrusions can be permitted only from current tip layer faces (e.g., primitives 13 and 14 of FIG. 1). For each selected tip face to be extruded, a new corresponding face is created on a new layer, thereby generating a new prism in the hair mesh. In a common example, face extrusion can be used to begin defining a hair mesh, starting from a root layer.

Layer/Face Delete: This operation can be used to delete a face at a tip layer, thereby removing that layer, and the last prism of the hair mesh, such that the tip layer for hairs that were terminated at the deleted face now becomes a previous layer defined according to the correspondences defined between the deleted face and a face on a previous layer.

Layer/Face Insert: This operation can be used for creating new layers between two layers. A pair of corresponding faces on consecutive layers can be selected, and a new corresponding face is generated on a layer that is placed between the selected two layers. This operation divides the prism that connect faces of the selected pair of layers into two prisms. One prism connects the initial face on the subsequent layer to the new face, and the other prism connects the new face to the initial face on the previous layer.

Layer/Face Remove: This operation can be used to remove selected layer(s) from the hair mesh. After the selected layer(s) are deleted, the remaining layers are rejoined using the previous ordering of remaining layers (correspondence among faces), as well as any mapping information for points that may be defined for remaining layers. When the layer to be removed is a tip layer, this operation is functionally equivalent to face delete. In one approach, the root layer can be protected from deletion. However, in another approach, removing the root layer can proceed similarly to removing a tip layer.

The above operations can be conducted on a face by face basis, or on a number of faces comprised in a surface (layer), and reference to only a face or a layer is not an implication that only a face or a layer can be manipulated in the fashion disclosed.

Edge and Vertex Separate: Vertices and edges shared by more than one primitive (a face) in a single layer can be topologically separated. This topological separation creates multiple edges/vertices that are topologically separated. Subsequent modeling operations may act on these new edges and vertices. For example, gap 22 of FIG. 1 can be formed by splitting primitive 13 and primitive 14, which were previously sharing a common edge.

Edge and Vertex Weld: The weld operation is the inverse of a separate operation, and topologically (and geometrically) joins selected vertices and/or edges.

Face and Edge Divide and Subdivision: When a hair mesh face is split or subdivided, the same operation can be applied to its corresponding faces. By applying the split operation to all corresponding faces, multiple bundles of hairs can be generated from a single bundle of the selected primitive (face), e.g., hairs that terminate at primitive 14 can be split into two or more bundles by splitting primitive 14.

Styling Operations

Hair mesh modeling can be thought of as an initial stage of modeling hair. Information provided by (or conveyed by) the hair mesh defines the overall shape of the hair model and also can be used to specify/generate hair strands conforming to that model. For adding extra realism, or achieving other effects, additional modeling operations can be performed on the generated hair strands. Hair modeling operations applied to hair strands after their specification/generation are referred to as styling operations. Although not a principle subject of the present disclosure, styling operations also can be conducted on guide hairs, or even on constituent data elements of the hair mesh. The disclosures herein can be applied to such situations as well.

Procedural hair styling is an example category of such operations. These operations can deform hair strands by moving vertices of the hair strands using procedural noise and mathematical functions with various parameters.

Figures 10, 11:
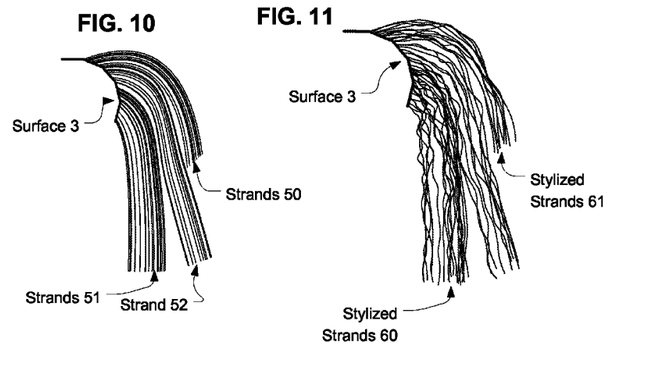
FIG. 10 depicts hairs that can be placed according to implementations of the example approaches herein.
FIG. 11 depicts the hairs of FIG. 10 after an example styling operation.

FIG. 10 shows hair strands generated from the example hair mesh 1, rooted in surface 3, and in particular, strands 50 that have as a tip surface, primitive 12, and strands 51 and 52 that have tip surfaces of primitives 13 and 14 respectively.

Figure 12:
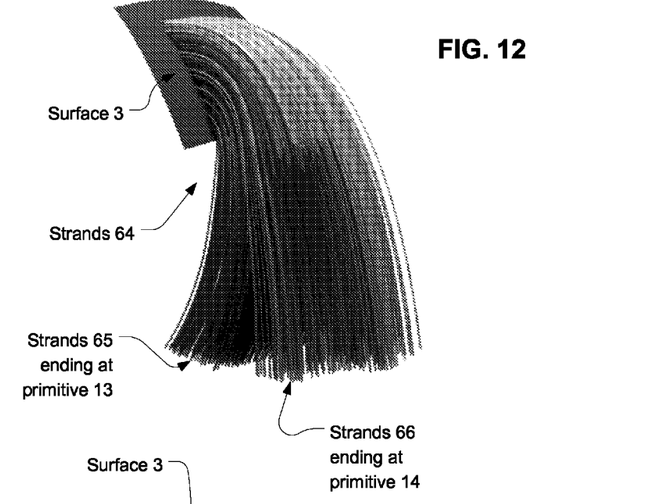
FIG. 12 depicts another view of the hairs of FIG. 10.
Figure 13:
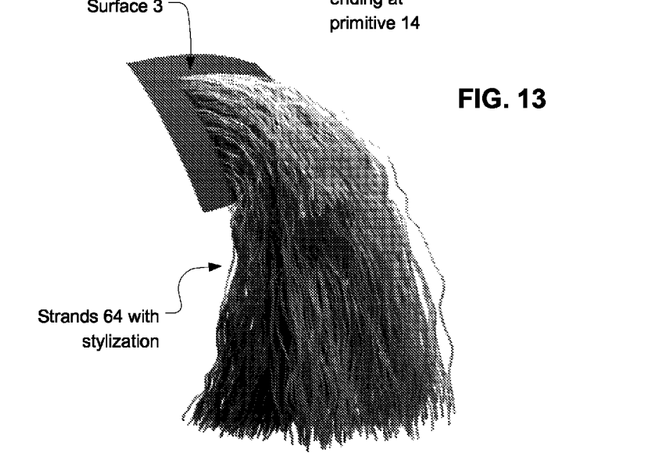
FIG. 13 depicts a styling operation on the hairs depicted.

FIG. 11 depicts final hair strands after the application of a procedural noise operation, now referring to stylized strands 61 and 60, by way of example. Similarly, FIG. 12 depicts a different view of such hair strands, and final hair strands after stylization (FIG. 13).

In addition to styling operations, hair meshes can be used to produce hair wisps or guide strands, that serve as a basis for defining other hair strands in a complete hair model. Curves defining the guide strands can be created and stored on a computer readable medium, for usage in creating the hair model later, such as during a run time of a video game, motion picture, or even during future editing operations. This is achieved by generating wisp curves from the hair mesh similar to generating hair strand curves. In this case, individual hair strands may not directly generated from the hair mesh, but the wisp curves along with a number of parameters instead can be used to populate final hair strands. Wisp curves themselves can go through procedural styling operations or explicit user modifications before generating the hair strands.

Figure 14:
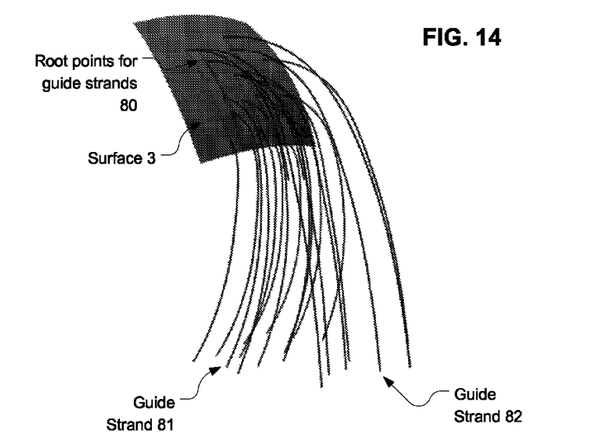
FIG. 14 depicts guide hairs that can be produced based on the hair model information described above.
Figure 15:
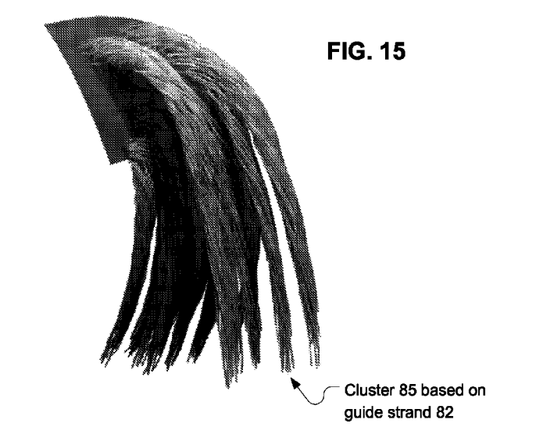
FIG. 15 depicts hairs that can be created from the guide hairs of FIG. 14.

Using hair meshes for generating wisp curves simplifies hair modeling processes using wisp curves. FIG. 14 shows wisp curves (guide strands) 80 generated from the hair mesh model in FIGS. 1-5, and rooted in surface 3. Guide strands 81 and 82 are particularly identified. FIG. 15 depicts a hair style that can be created from the guide strands 80 of FIG. 14, where hair bundles are determined. Still further operations can disperse bundling of hair strands that are created based on different guide hairs, if desired.

In an exemplary embodiment, a user can begin modeling hair by modeling the hair mesh structure starting with a root object. Using the topological operations explained above, the user can build the hair mesh and shape the hair mesh as desired. The user can also animate this hair mesh if desired. Individual hair strands can be generated using this hair mesh. These hair strands can be modified using a collection of styling operations, the parameters of which are controlled by the user. This results in a collection of hair strands that form the hair model.

Figure 16:
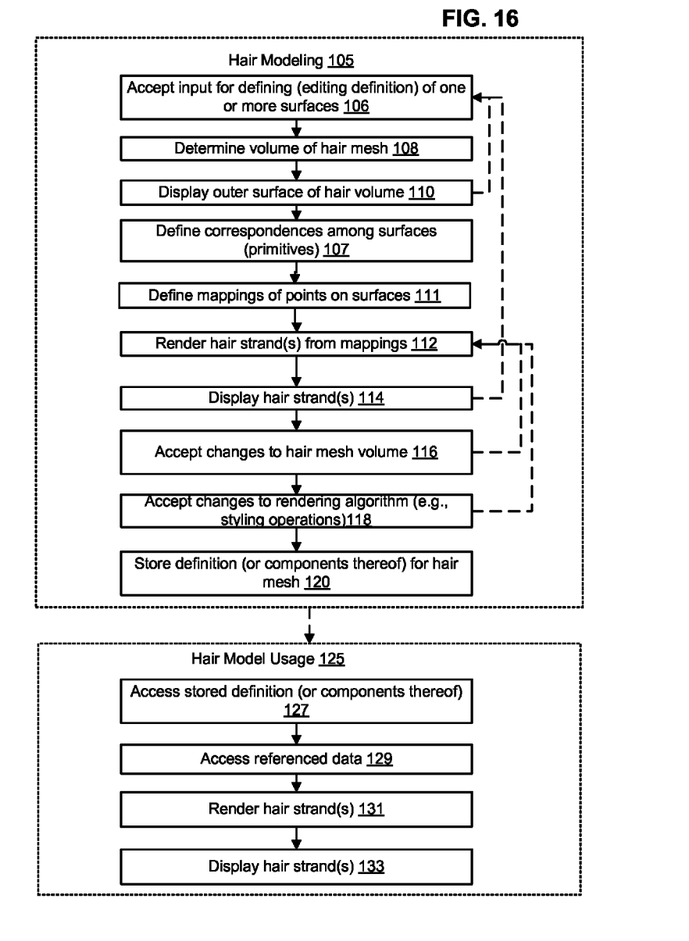
FIG. 16 depicts an example workflow of modeling a hair style using an implementation of the hair mesh aspects disclosed, followed by a rendering phase.

FIG. 16 depicts a more specific example method in which a group of hair modeling operations 105 are conducted preceding a hair model usage 125 (such as in a run time of a video game, or more simply a visualization of the hair model as currently defined). It is noted the operations depicted in FIG. 15 need not be all implemented in a given system or method according to these aspects, nor would a user necessarily use all such functions, if all such functions were provided. Still further, the example order of operations in FIG. 15 does not imply that such order is necessary for practicing implementations of such method.

FIG. 13 depicts that input for defining (or editing a definition) of a hair mesh can be accepted, such as through a user interface (as explained with respect to FIG. 17, below). From the hair mesh as currently defined, a volume of the hair mesh can be determined (108), and an outer surface of the hair mesh volume can be displayed (110). FIG. 5 provides an example of displaying an outer volume of a hair mesh. Such input for defining/editing can include model editing operations described above, such as adding, deleting or modifying faces to the hair mesh.

One or more correspondences among the can be defined (107); this action can be taken during an initial creation of a hair mesh, once more than one surface is added to the mesh. For example, with surface 3 in place (FIG. 1), once surface 4 was added, a correspondence definition can be made between surface 3 and surface 4. As explained above, such correspondences also can be applied on a primitive by primitive basis.

Mappings of points on the corresponding surfaces (primitives) can also be defined (111). As explained these mappings can be defined by barycentric coordinates on corresponding surfaces. Thus, a mapping of points on a set of corresponding (surface) primitives is a sufficient definition for a hair strand. And so, one or more hair strands can be rendered based on such information. The rendered hair strand(s) can be displayed (114) on a display, so that a user can view them. The user can modify aspects of the hair strand rendering algorithm(s) (118), such as by changing styling operations. The user also can switch back to a hair mesh view (viewing an outer volume of the hair mesh) and manipulate the outer volume, such as by using operations described above. In each case, the display can be updated (110 and/or 114), and inputs can again be received. If a user is satisfied with the outputs of the current hair mesh and other input parameters, then a hair mesh definition, or components thereof can be saved (12). For example, guide strands can be saved, or information defining an entirety of the hair mesh can be saved.

Hair model usage (125) can be based on such saved information. For example, a stored definition of the hair mesh, or of guide strands can be accessed (127). Other data also can be accessed. For example, rendering data, such as textures, or scene information can be accessed (129). Such scene information may affect an overall output of the hair style, where physical effects modeling, is to be done, for example. Hair strands can be rendered (131) based on the information accessed (the hair mesh, or guide strands, for example), and those hair strand(s) can be displayed (133). Displaying also can encompass animating, or using the hair strand(s) in a scene being rendered, and other operations. Of course, such operations can also be precursors to further hair mesh editing.

Figure 17:
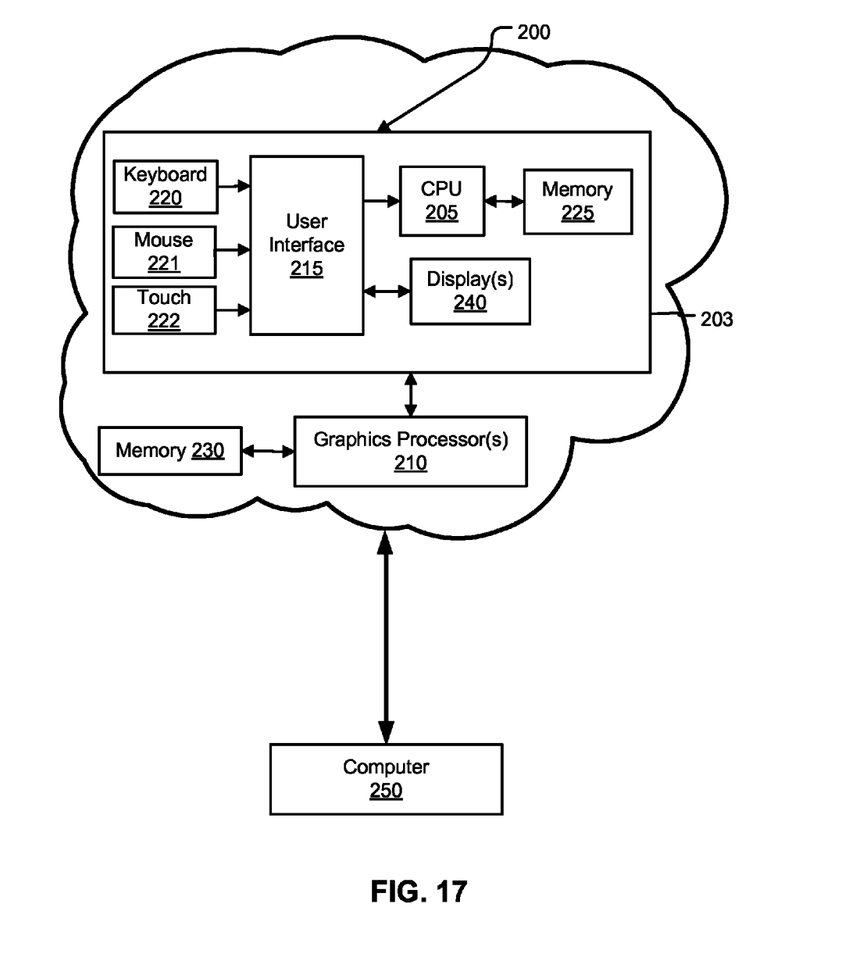
FIG. 17 depicts an example computation system architecture in which implementations of these aspects can be practiced.

FIG. 17 depicts an example block diagram of a device 200 in which aspects described herein can be practiced. Exemplary device includes a CPU 205, which can be implemented one or more processors, or processor cores, for example, and any of a variety of processor implementations can be used as CPU 205. CPU 205 is coupled with user interface 215 components, examples of which include a keyboard 220, a mouse 221, and a touch-based interface 222, a display 240 receives output to be displayed, and can be composed of one or more display elements, such as LCD monitors, for example. A memory 225 serves to store information for use by CPU 205. A graphics processor 210, which can comprise one or more graphics processor elements, can render graphics for output to display 240. Graphics processor 210 can represent, for example, one or more graphics cards operating over a PCI Express bus, for example. Such graphics cards can be configured to communicate with each other, as well as access a dedicated graphics memory 230. Memory 230 can be implemented as a sub-portion of memory 225, or as a separate memory. Typically, high-performance graphics implementations include a high performance memory sub-system.

Such computer 200 can be accessed over a network, or several interconnected networks, such as the Internet, for example. Computer 250 depicts that it is coupled with device 200 through one or more networks, and can obtain outputs of implementing the aspects described herein, such as being able to edit hair meshes through a web browser, or a web browser plug in, obtain definitions of hair meshes, or guide hairs that can be used in creating hair styles at a future time, and so on.

Furthermore, the hair mesh can be used for rendering and animation of the hair model. The animation of the hair mesh defines an animation of the hair model. Using the shape of the hair mesh at a time step, the individual hair strands can be generated and rendered. This procedure is useful for real time rendering of hair using the graphics hardware.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including combinations of general purpose and special purpose computing devices, chips or systems. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly can use the connection itself as a computer-readable medium, at least because the connection functions as an access mechanism for a remotely readable non-transitory computer-readable medium. Combinations of the above are included within the scope of the computer-readable media.

Computer-executable instructions include, for example, instructions, data, such as configuration data, which cause a general purpose computer, a special purpose computer, or a combination thereof to perform a function or group of functions specified, or otherwise perform specified operations on data or make transformations to data and/or physical objects. Computer-executable instructions also include program modules that are executed by and/or incorporated in computers, devices, and infrastructure equipment. Examples of program modules include routines, programs, components, data structures, objects, and the functions embedded into a design of special-purpose processors, so that the computational hardware can perform particular tasks, produce and store data, and/or access data. Computer-executable instructions, associated data structures, and program modules that perform the specified procedures, steps, or methods according to these disclosures, and used to configure computation hardware represent examples of means for executing those specified procedures, steps and methods.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Particular categories of subject matter that relate to aspects of this disclosure include that products of the described methods can be used, accessed, and transmitted over networks, such that a device that is using the output of hair mesh methods according to these disclosures can be remote from a computer that is performing the method. For example, a remote computer can receive guide strands outputted according to an implementation of the disclosures, and use those guide strands to model a complete hair style.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure.

What is claimed is:

1. A computer-implemented graphics method for representation of hair-like geometry, comprising:
    defining, by a processor, data describing a plurality of surfaces, each surface composed of one or more primitives, wherein at least one surface of the plurality of surfaces has one or more of different interconnections between primitives of that surface and a different number of primitives than the other surfaces of the plurality of surfaces;

defining, by the processor, correspondence data that establishes a plurality of correspondences among respective selections of the primitives, wherein the defining comprises forming one or more of the plurality of correspondences from a respective selection of primitives of a proper subset of the plurality of surfaces;

providing data, stored on a non-transitory medium coupled with the processor, defining one or more mappings, each mapping comprising a set of points located on the primitives of a respective correspondence; and outputting data descriptive of one or more elements of hair-like geometry, based on the sets of points comprised in the mappings, wherein the one or more elements of hair-like geometry comprise at least one of guide hair strands and hair strands.

2. The computer-implemented graphics method of claim 1, wherein the outputting data descriptive of one or more elements of hair-like geometry comprises modifying one or more locations of points in the sets of points, and performing the defining based on the modified one or more locations of points.

3. The computer-implemented graphics method of claim 1, wherein borders of primitives of one or more correspondences are inter-connected with one or more of lines, curves, and surfaces.

4. The computer-implemented graphics method of claim 1, further comprising producing the data descriptive of one or more elements of hair-like geometry by defining each element of hair-like geometry based on a respective mapping.

5. The computer-implemented graphics method of claim 1, wherein the one or more elements of hair-like geometry comprise both guide hair strands and hair strands, and the method further comprises defining a plurality of strands of hair, using the guide hair strands as guide(s).

6. The computer-implemented graphics method of claim 1, further comprising receiving input and interpreting that input to indicate deformation of respective shapes of one or more of the primitives.

7. The computer-implemented graphics method of claim 1, further comprising receiving input indicating deformation of an outer surface, which is defined by connections between edges of the plurality of surfaces that are disposed transverse to the outer surface, and responsively deforming an interior part of one or more of the plurality of surfaces.

8. The computer-implemented graphics method of claim 7, wherein the plurality of surfaces each comprise internal vertices that are automatically repositioned during the deforming of the one or more of the plurality of surfaces.

9. The computer-implemented graphics method of claim 1, wherein the primitives composing the surfaces are defined by vertices, comprising border vertices for defining borders of the surfaces, and internal vertices.

10. The computer-implemented graphics method of claim 9, further comprising modifying positions of internal vertices responsive to changes to external vertices.

11. The computer-implemented graphics method of claim 9, further comprising changing positions of one or more internal vertices responsive to receiving input representing changes to a respective position of one or more border vertices.

12. The computer-implemented graphics method of claim 11, further comprising calculating the changed positions of the internal vertices by a minimization process.

13. The computer-implemented graphics method of claim 1, further comprising defining the shapes of the surface primitives by respective collections of vertices.

14. The computer-implemented graphics method for representation of hair-like geometry of claim 1, wherein the defining data describing the plurality of surfaces comprises defining each surface to have a respective plurality of primitives, the respective primitives of each surface defined by interconnections among a respective set of vertices, the vertices including exterior vertices at an edge of the surface and internal vertices.

15. The computer-implemented graphics method for representation of hair-like geometry of claim 14, further comprising defining a shell by defining interconnecting exterior vertices of adjacent surfaces of the plurality of surfaces to form facets of the shell.

16. The computer-implemented graphics method for representation of hair-like geometry of claim 15, further comprising defining volume elements within the shell by interconnecting internal vertices of adjacent surfaces of the plurality of surfaces to form facets that are interior to the shell, the volume elements bounded by primitives on two adjacent surfaces and one or more of interior and exterior facets between the adjacent surfaces that complete a respective shell of that volume element.

17. The computer-implemented graphics method of claim 16, further comprising interpreting received input to indicate deformation of the shell, and determining a deformation of one or more volume elements based on the deformation of the shell, and updating positions of vertices of primitives defining the one or more volume elements.

18. The computer-implemented graphics method of claim 17, further comprising updating a set of points of a correspondence based on the updated positions of vertices of primitives that participate in that correspondence.

19. The computer-implemented graphics method for representation of hair-like geometry of claim 16, wherein the exterior vertices of adjacent surfaces are interconnected with one or more of lines and curves, and the interior vertices of adjacent surfaces are interconnected with one or more of lines and curves.

20. A computer graphics modeling method, comprising:
providing a definition of a hair mesh comprising a series of surfaces to a computer, each surface defined by one or more primitives, wherein at least one surface in the series of surfaces has one or more of different interconnections between primitives and a different number of primitives than the other surfaces in the series of surfaces; and defining elements of hair-like geometry, in the computer, using the provided definition of the hair mesh, each element of hair-like geometry starting at a respective root surface, and terminating at a respective tip surface of the series of surfaces, the defining comprising using correspondence data that establishes correspondences among respective selections of the primitives, each element of hair-like geometry defined based on a respective set of points located on the primitives of a respective correspondence, the elements of hair-like comprising one or more of a guide hair strand and a hair strand.

21. The computer graphics modeling method of claim 20, wherein each surface is composed of a plurality of primitives, and a path for each element of hair-like geometry from its root surface to its tip surface is defined based on a mapping including a primitive on each of its root surface, its tip surface, and each surface between its root surface and its tip surface.

22. The computer graphics modeling method of claim 21, wherein each mapping further comprises a barycentric coordinate that identifies a point on each primitive of that mapping.

23. The computer graphics modeling method of claim 20, further comprising storing, on a non-transitory computer readable medium, data defining a set of points for use in representing each element of hair-like geometry, each set of points defined by a barycentric coordinate on each of a primitive of the root surface, a primitive of the tip surface, and a primitive of each surface, of the series of surfaces, between the root surface and the tip surface of that element.

24. A non-transitory computer readable medium storing computer readable instructions for configuring a computer to perform a method comprising:
- defining data describing a plurality of surfaces, each surface composed of one or more primitives, wherein at least one surface of the plurality of surfaces has one or more of different interconnections between primitives of that surface and a different number of primitives than the other surfaces of the plurality of surfaces;
- defining correspondence data that establishes a plurality of correspondences among respective selections of the primitives, wherein the defining comprises forming one or more of the plurality of correspondences from a respective selection of primitives of a proper subset of the plurality of surfaces;
- providing data, stored on a non-transitory medium, defining one or more mappings, each mapping comprising a set of points located on the primitives of a respective correspondence; and
- outputting data descriptive of one or more elements of hair-like geometry, based on the sets of points comprised in the mappings, wherein the one or more elements of hair-like geometry comprise at least one of guide hair strands and hair strands.

25. A system for computer graphics hair modeling, comprising:
- an interface to accept input for obtaining a definition of a hair mesh comprising a series of surfaces, each surface defined by one or more primitives, wherein at least one surface in the series of surfaces has one or more of different interconnections between primitives and a different number of primitives than the other surfaces in the series of surfaces; and
- a processor configured to define elements of hair-like geometry, each starting at a respective root surface, and terminating at a respective tip surface of the series of surfaces, and to output data representative of at least some of the elements of hair-like geometry, the processor configured to define the elements of hair-like geometry by performing a method comprising defining correspondence data that establishes a plurality of correspondences among respective selections of the primitives, wherein the defining comprises forming one or more of the plurality of correspondences from a respective selection of primitives of a proper subset of the plurality of surfaces;
- providing data, stored on a non-transitory medium coupled with the processor, defining one or more mappings, each mapping comprising a set of points located on the primitives of a respective correspondence; and
- and using the one or more mappings to define the elements of hair-like geometry, wherein the elements of hair-like geometry comprise one or more of guide hair strands and hair strands.

26. The system for computer graphics hair modeling according to claim 25, wherein the data outputted comprises data representing one or more guide hair strands, and the method performed by the processor further comprises using the one or more guide hair strands to define hair strands.

27. The system for computer graphics hair modeling according to claim 25, wherein the interface comprises a display for displaying an outer surface of the hair mesh.

28. The system for computer graphics hair modeling according to claim 27, wherein the outputted data comprises a set of points for use in representing each element of hair-like geometry, each set of points identifying a position on each of a primitive of the root surface, a position on a primitive of the tip surface, and a primitive of each surface, of the series of surfaces, between the root surface and the tip surface for that element, and the processor further is to redefine positions responsive to deformation of the outer surface of the hair mesh.

* * * * *